United States Patent [19]

Tutt et al.

[11] 4,156,925
[45] May 29, 1979

[54] OVERLAPPED AND INTERLEAVED CONTROL STORE WITH ADDRESS MODIFIERS

[75] Inventors: William E. Tutt, Boca Raton; Virgil D. Wyatt, Light House Point, both of Fla.

[73] Assignee: International Business Machines Corporation, Armonk, N.Y.

[21] Appl. No.: 681,955

[22] Filed: Apr. 30, 1976

[51] Int. Cl.² .................. G06F 13/00; G06F 9/16; G06F 9/10; G06F 9/20
[52] U.S. Cl. .................................................. 364/900
[58] Field of Search .................... 340/172.5; 445/1; 364/200 MS File, 900 MS File

[56] References Cited

U.S. PATENT DOCUMENTS

| | | | |
|---|---|---|---|
| 3,391,394 | 7/1968 | Ottaway et al. | 364/200 |
| 3,689,895 | 9/1972 | Kitamura | 340/172.5 |
| 3,696,340 | 10/1972 | Matshushita et al. | 340/172.5 |
| 3,725,868 | 4/1973 | Malmer et al. | 340/172.5 |
| 3,736,567 | 5/1973 | Lotan | 364/200 |
| 3,745,532 | 7/1973 | Erwin | 340/172.5 |
| 3,766,532 | 10/1973 | Lieber et al. | 364/200 |
| 3,851,312 | 11/1974 | Erwin | 340/172.5 |
| 3,866,180 | 2/1975 | Willette | 364/200 |
| 3,868,649 | 2/1975 | Sato et al. | 340/172.5 |
| 3,886,523 | 5/1975 | Ferguson et al. | 340/172.5 |
| 3,900,835 | 8/1975 | Bell et al. | 340/172.5 |
| 3,909,797 | 9/1975 | Goss et al. | 364/200 |
| 3,931,615 | 1/1976 | Oliver et al. | 364/900 |
| 3,947,822 | 3/1976 | Watanabe et al. | 340/172.5 |
| 3,953,833 | 4/1976 | Shapiro | 340/172.5 |
| 3,956,738 | 5/1976 | Tessera | 340/172.5 |
| 3,959,777 | 5/1976 | Kimmel | 364/900 |
| 3,972,028 | 7/1976 | Weber et al. | 364/200 |
| 4,038,643 | 7/1977 | Kim | 364/200 |
| 4,050,058 | 9/1977 | Garlic | 364/200 |
| 4,054,945 | 10/1977 | Ichiko et al. | 364/200 |

*Primary Examiner*—Gareth D. Shaw
*Assistant Examiner*—Jan E. Rhoads
*Attorney, Agent, or Firm*—Bernard M. Goldman

[57] ABSTRACT

This invention relates to controls for a control store made of plural modules which operate in an overlapped continuous manner, wherein the modules are cycled in a fixed sequence.

This invention particularly relates to a novel next address generation and handling means for a control store using time interleaved modules.

14 Claims, 18 Drawing Figures

FIG. 1

FIG. 2 (PROCESSOR DATA PATH)

FIG. 3 (CONTROL STORE CONTROLS)

FIG. 3E

FIG. 3A (ROS NEXT ADDR GEN)

FIG. 3B  (ROS CURRENT WORD SELECTOR)

FIG. 4A (NORMAL NEXT ADDRESSING MODE)

FIG. 6 (BRANCH UNCONDITIONAL NEXT ADDR MODE)

FIG. 7

FIG. 8 (BR. COND. "USE" μ-WORD)

FIG. 9 (BR. MASK μ-WORD)

(READ GPR R μ-WORD)

OVERLAPPED AND INTERLEAVED CONTROL STORE WITH ADDRESS MODIFIERS

BACKGROUND

The prior art describes interleaved main stores for writing and fetching data and instructions in order to decrease the access time to the main store by a sub-multiple of the access time for any single module.

The subject invention also uses a plurality of storage modules to derive a decrease in access time for a control store. However, beyond this point, the similarities end between the subject control store and the conventional interleaved main store.

Adddressing for prior main memories, whether interleaved or not, is generated normally from an instruction counter in the system which is operated under control of a macro-program. That addressing technique is not used with the subject invention, and it is replaced by a novel addressing technique.

Prior control stores generally have a relatively large proportion of their capacity dedicated to the next addressing requirement. As a result, a high percentage of the storage capacity of prior control stores is used up by next addressing fields.

Also, the size of the next address field in the conventional control store limits the size of the control store. This limitation is greatly reduced by the subject invention.

U.S. Pat. No. 3,391,394 to Ottaway et al. is the most pertinent known prior art. It describes a non-interleaved and non-overlapped control store comprised of a single ROS module which contains addressable units called storage words. Each storage word contains three microwords which are read out of the ROS as a parallel group. But only one of the three microwords in a readout storage word is selected by a ROS register for subsequent execution. The selected microword has a next address field, which selects the next storage word for ROS readout and one of its three microwords for execution. Thus, during each ROS readout cycle, only one of three readout microwords is available for execution.

In the subject invention only one microword is read out during each cycle, and every microword read from any ROS module is available for execution. Hence, smaller ROS addressable units are available with the subject invention as compared to the prior patent's ROS system with a resulting increase in microword execution speed.

U.S. Pat. No. 3,391,394 also provides USE microinstructions which use data bits obtained from the data path to modify the address for the next ROS storage word. The subject invention extends the art of USE micro-instructions by teaching their novel implementation in a plural ROS module interleaved and overlapped environment.

SUMMARY OF THE INVENTION

The subject invention provides a unique addressing arrangement for a control store comprised of plural modules operated in a time interleaved manner to obtain highly efficient use of the storage capacity in the control store modules, which are interleaved to improve access time and to extend addressibility. The invention implements a "normal" format for micro-instruction control words (i.e. microwords) in which a next address modifier field is provided instead of a complete next address field. The modifier field uses only a fraction (i.e.1/M) of the number of bits required in a complete address, in which M is the number of interleaved modules in the control store. The size (in number of bits) of the "next address modifier" field may be represented by the expression, "$F = A/M$", in which F is the number of bits in the next address modifier address field, and A is the number of bits required in a complete control store address for addressing any microword in the same module.

A consequence of the reduction in the number of next addressing bits in normal microwords is that the total size of the control store is no longer limited by the number of next address bits per control word, but it becomes a function of the number of bits in the entire control word and the number of modules.

Furthermore, the next address modifier field in the "normal" microword is combined in different ways with a previously generated microword next address, in order to generate the next address for accessing the next microword in the same control store module from which the modifier field was read. The different ways involve different justifications (i.e. alignments) of the current microword's modifier field with the previously generated ROS next address. That is, each module uses a particular justification which is different from the justification used by each of the other modules.

The starting address in any specified module for microprograms in the control store is obtained by a conventional type of unconditional branch, except that the target address must be in the same module; the microword next address contains the full address needed for directly accessing any word in the same control store module. Thereafter, the more efficient unique "normal" modified next addressing technique is used to save control store space, since only a relatively small percentage of each "normal" microword is devoted to the next addressing function.

The space efficiency derived from this "normal" addressing mode permits a reduction in the size of the control word, which results in smaller and more efficient control stores. For example, in a conventional control store using 16 bit words and requiring a 12 bit address, 75% of the control store capacity is used up by next addressing requirements, and only 25% is available for data path control. With this invention, only 4 bits in the 16 bit normal word is used for next addressing requirements, reducing that overhead to about 25%, and leaving approximately 75% for data path control, which is almost a 300% improvement in the control function efficiency of the control store.

Furthermore a 75% overhead factor is unacceptable. Hence, 16 bit control words are impractical in stores having $2^{12}$ control words requiring 12 bit conventional next address fields. The result is that this invention makes practical the use of a 16 bit control word in, for example, a $2^{12}$ word module. It provides an increase in control store efficiency for a given set of control functions beyond what is expected from the interleaved module speed increase.

A third type of control word addressing is provided by this invention for selectively permitting data path or microprogram inserted bits to control microprogram conditional branching. Unique "use" microword implementation is provided by this invention for obtaining such conditional branching.

It is therefore a primary object of this invention to obtain high-speed control store operation with low-speed control store hardware modules, which may be implemented in either writable control store (WCS) hardware or read-only control store (ROS) hardware.

It is another object of this invention to provide a control store with a unique type of next addressing which reduces the amount of the control store dedicated to next addressing requirements, and at the same time increases the maximum addressable size of the control store.

It is a further object of this invention to provide a control store which has plural control store modules operated in an interleaved and overlapped manner, and which uses unique next addressing operations.

It is another object of this invention to provide a control store in which a full range of control store addressing is obtained with a unique form of next address modifier fields in normal mode microwords; this permits the generated next address to access a control word anywhere in any module of the control store when the control store has previously cycled once through each of its modules.

It is a further object of this invention to provide full range control store addressing by using staggered justification when combining the next address modifier fields in the normal microwords with the last derived full address, in which the amount of justification is determined by which module contained the microword having the current modifier field. Thus the amount of justification is different for the different modules, but the same justification is used for all normal microwords in the same module.

It is another object of this invention to provide address modification using a minimum number of next address modifier bits in normal microwords for addressing across the total address range of the control store.

It is still another object of this invention to provide in a preferred embodiment a four-bit next address modifier field in normal microwords for modifying a twelve-bit complete control store address.

It is a further object of this invention to maximize performance and minimize the economic cost for the construction of a high-speed control store by providing an interleaved and overlapped arrangement of relatively slow speed and low-cost control store modules.

It is another object of this invention to provide an interleaved overlapped plural module control store in which the maximum microword size of the control store can be increased without increasing the size of the microword address by increasing the number of time-interleaved modules in the control store. Furthermore, the size of a next address modifier field is decreased as the number of modules is increased.

It is a further object of this invention to provide an interleaved control store which enables an "execute" function to be performed for selecting general purpose registers designated by macro-instructions.

Other objects, features and advantages of the present invention will become more apparent in the light of the following detailed description of a preferred embodiment thereof, as illustrated in the drawings.

DETAILED DESCRIPTION OF THE PREFERRED EMBODIMENT

Plural ROS Modules

Figure 3:
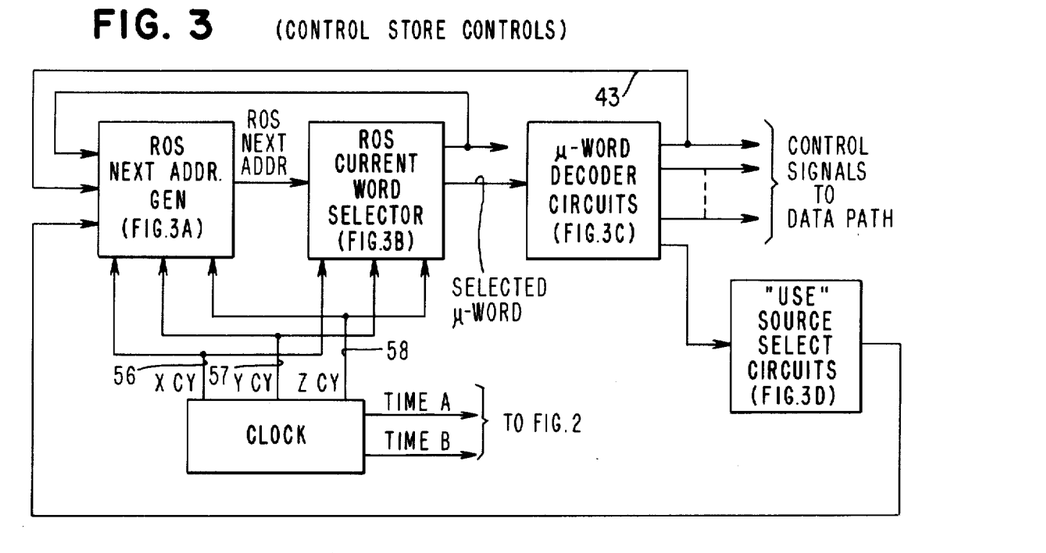
FIG. 3 is an overall block diagram of the control store and its controls used in the preferred embodiment.
Figure 3A:
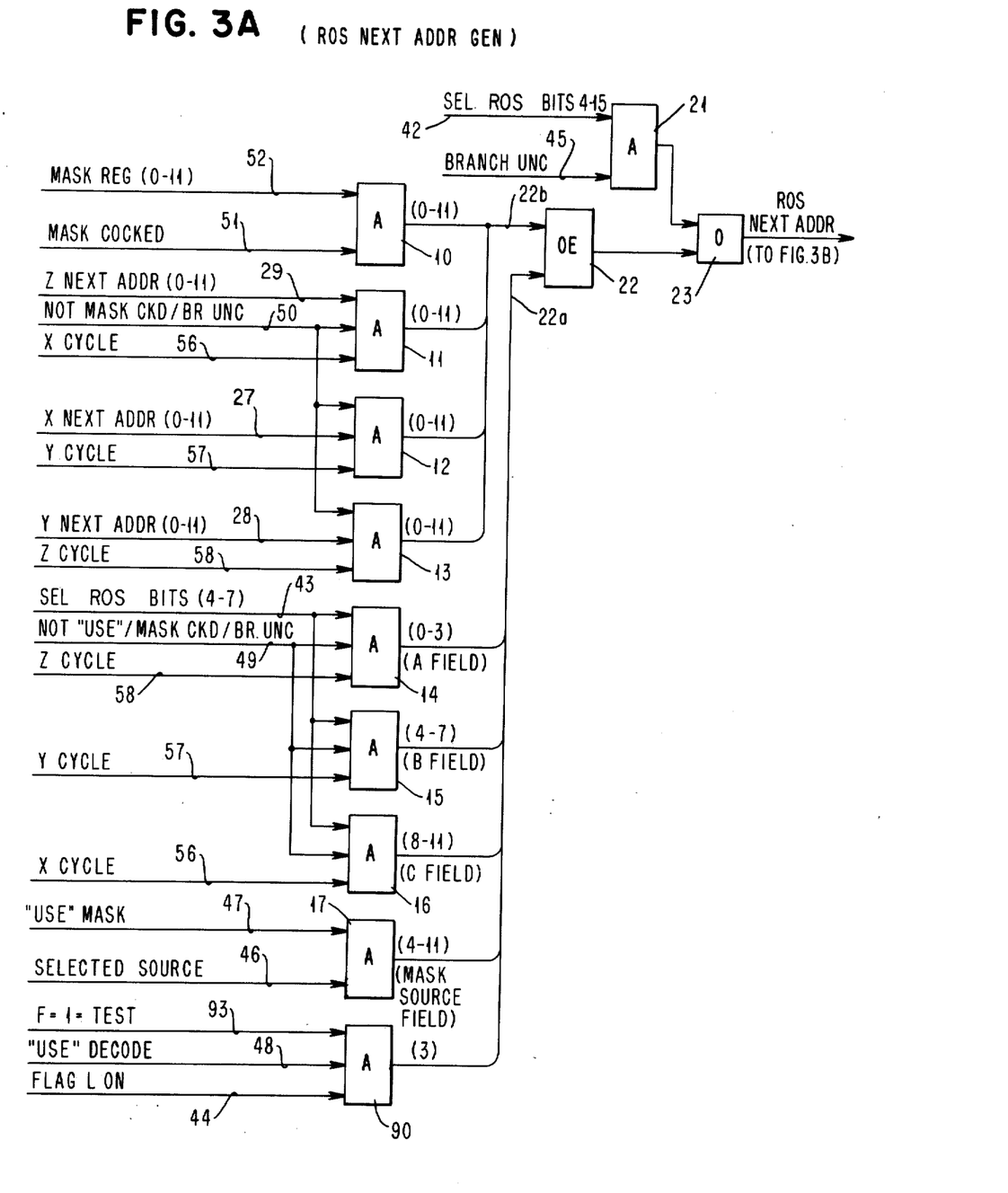
FIGS. 3A, 3B, 3C, 3D and 3E illustrate in detail the preferred control store and its controls for providing control signals which operate the data path shown in FIG. 2.
Figure 3B:
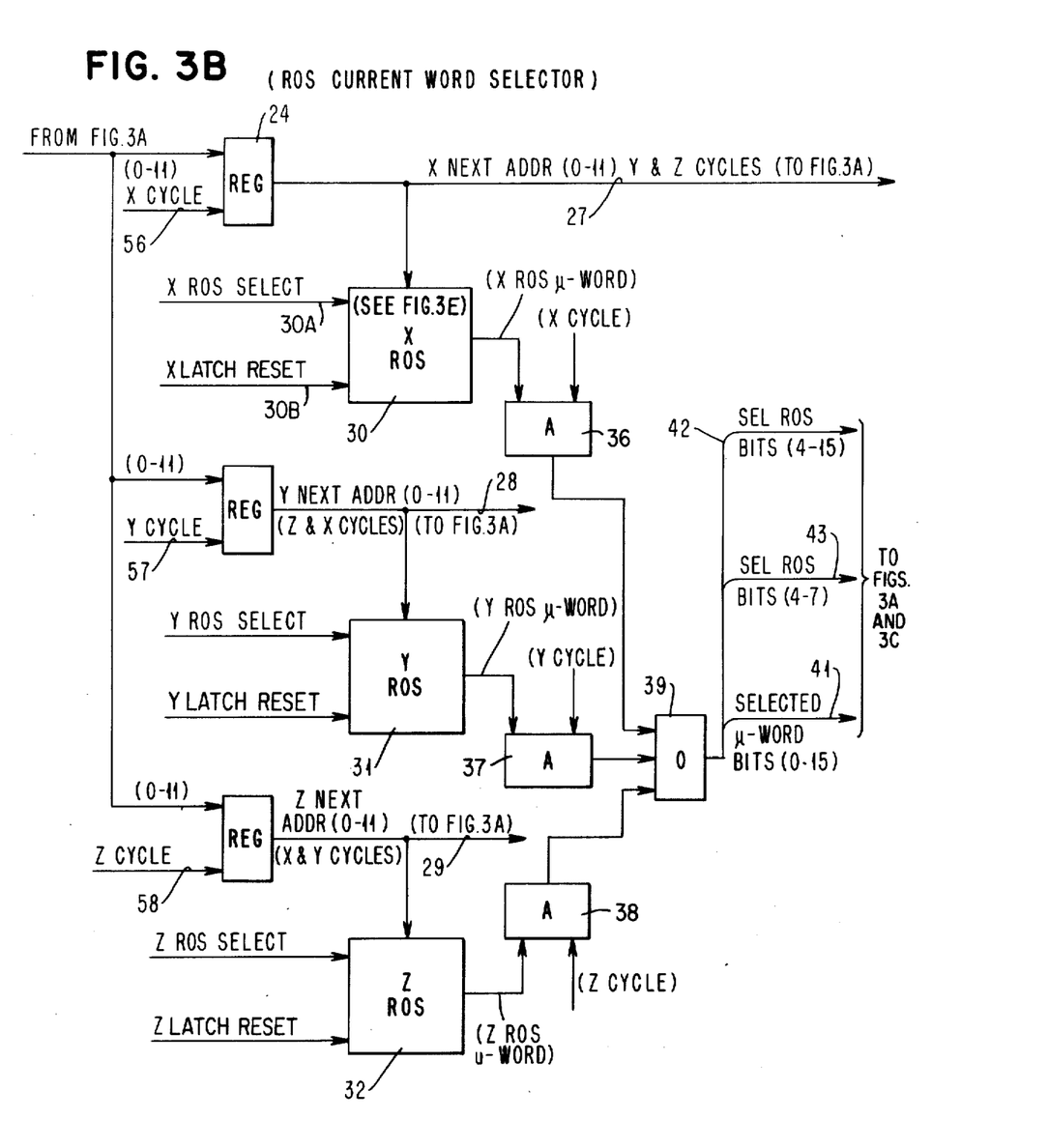

FIG. 3B illustrates three modules 30, 31 and 32 which comprise the control store found in the preferred embodiment. Each of these modules is a separate hardware entity of the conventional read-only store (ROS) type, which could instead be writable control store modules except for cost and access time factors. These three modules are labeled the X ROS, Y ROS and Z ROS, respectively.

Figure 1:
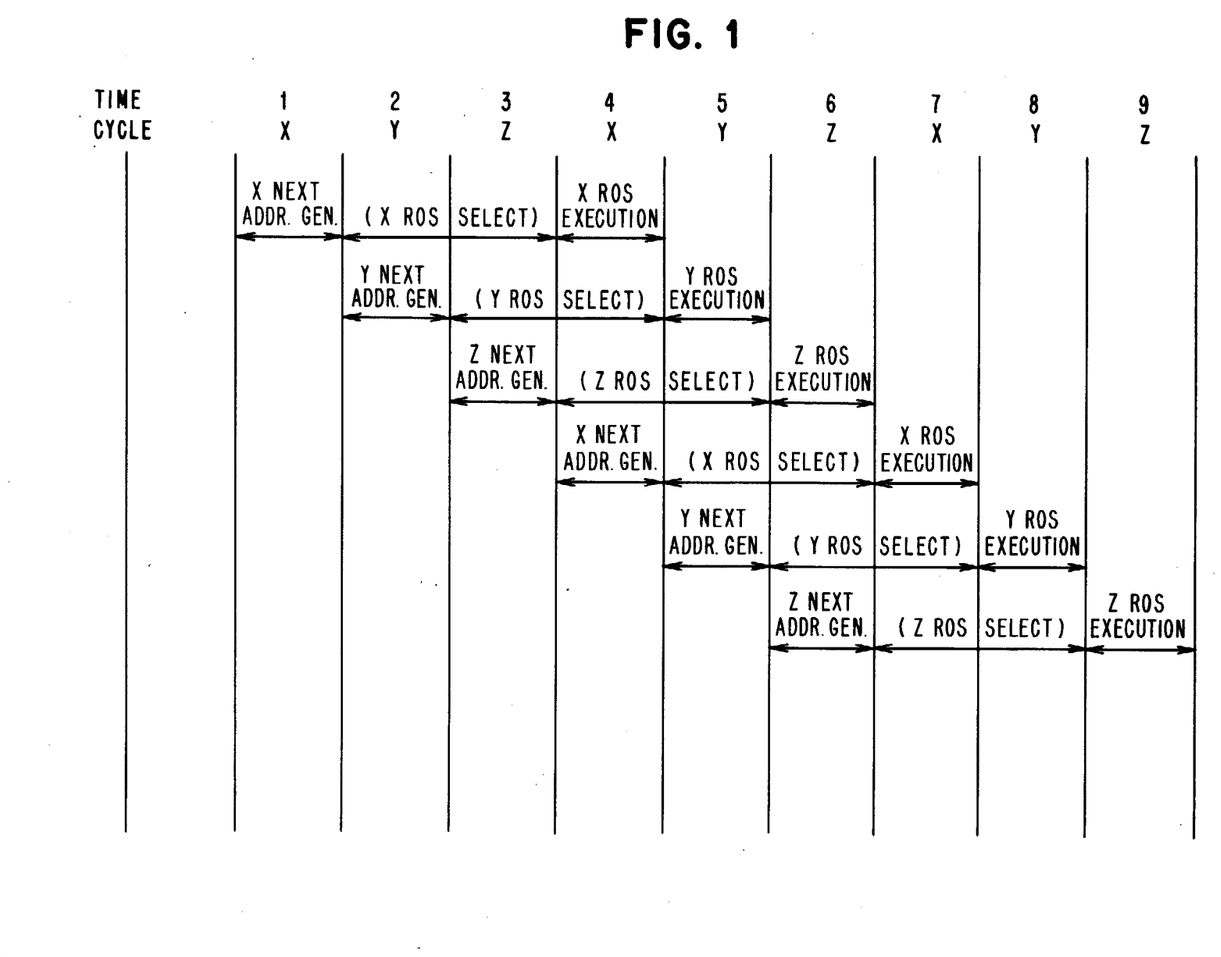
FIG. 1 is a timing chart showing the overlapped and interleaved timing relationship in the operation of a control store having three ROS modules in a preferred embodiment.
Figure 3C:
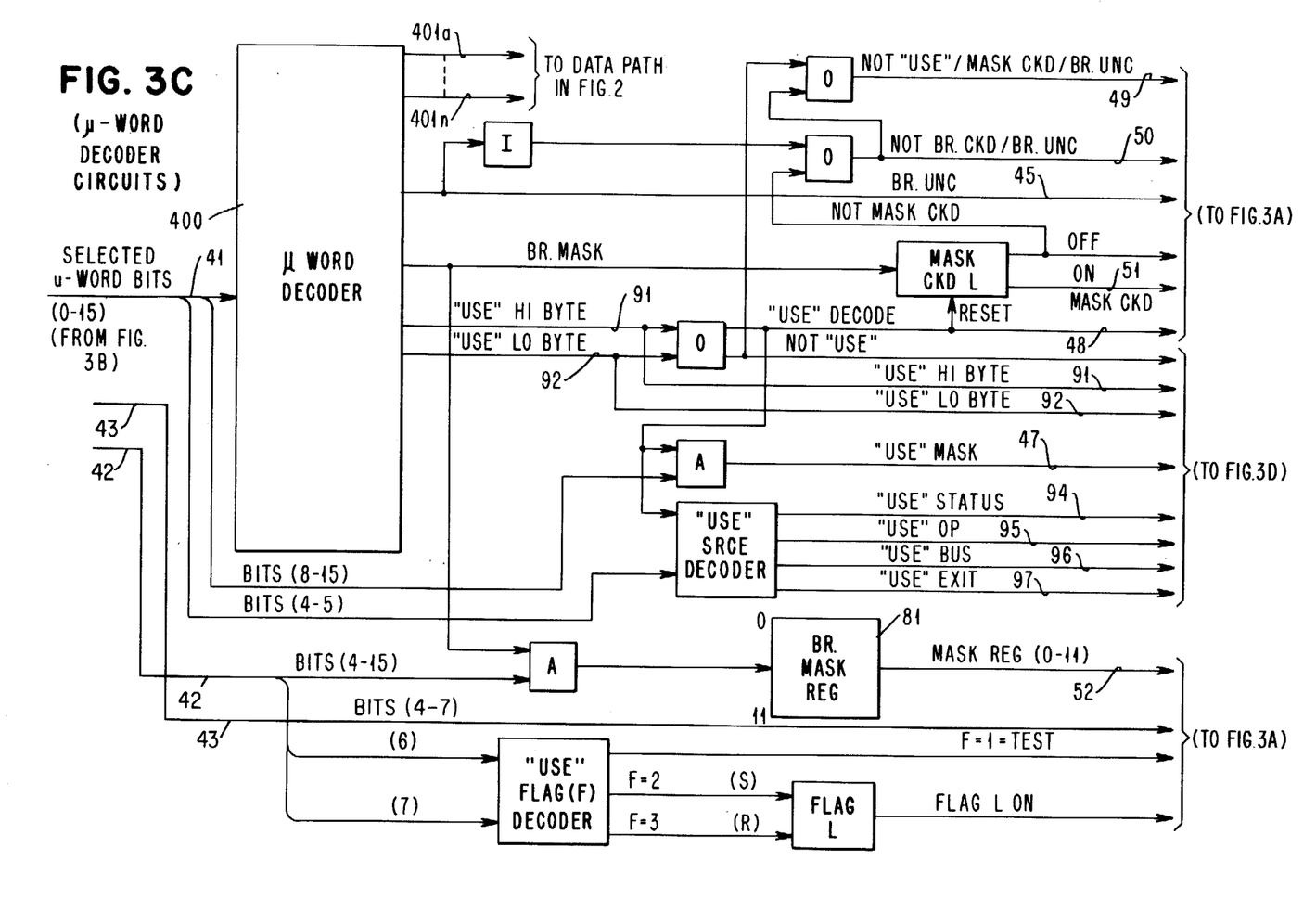
Figure 3D:
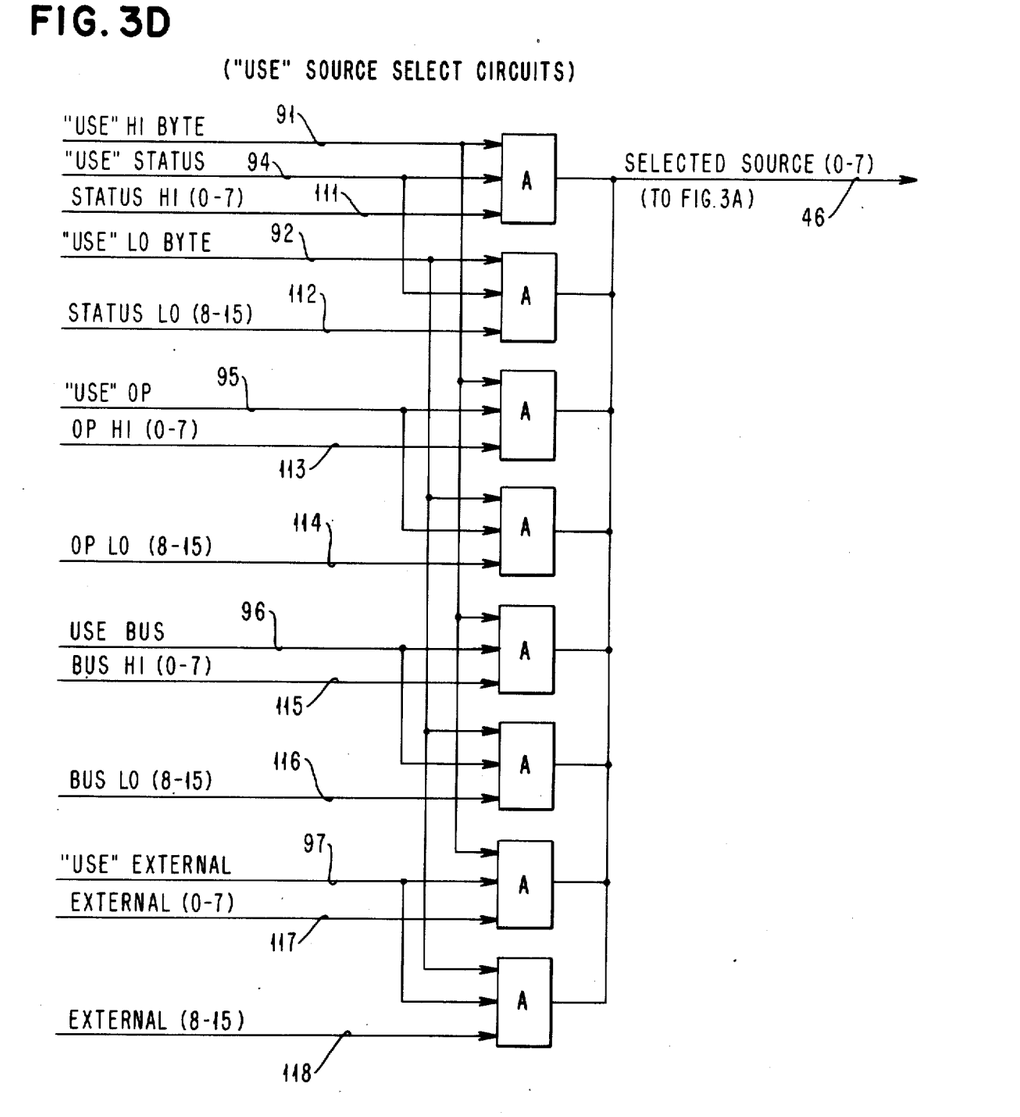
Figure 3E:
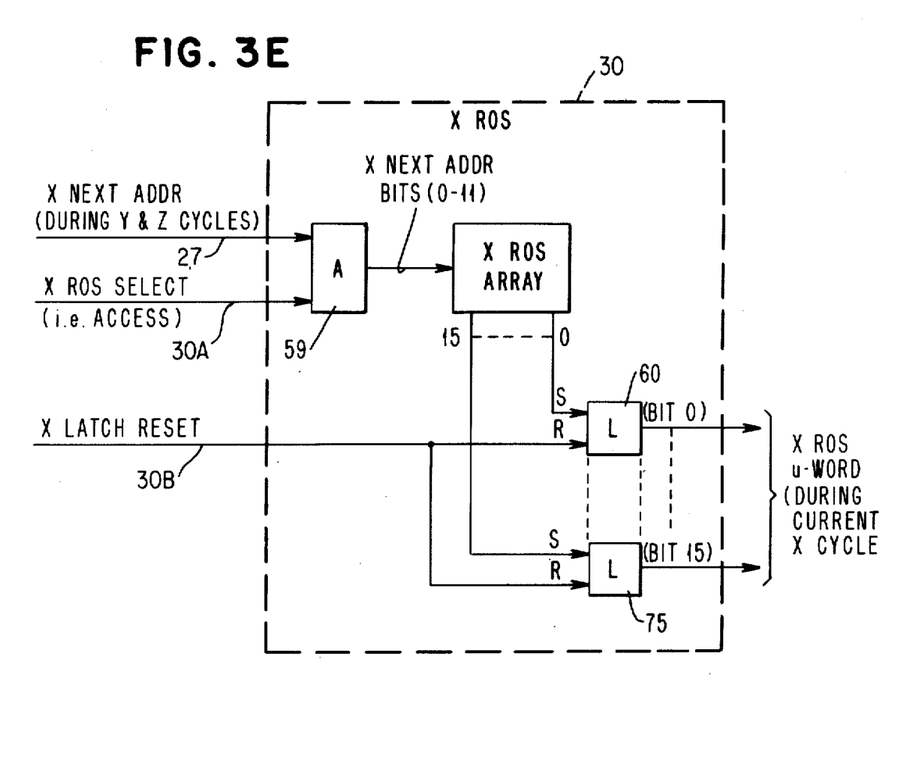

FIG. 3E illustrates the content of the X ROS 30. It outputs a 16 bit microword during each X cycle from the clock shown in FIG. 3. The Y ROS 31 and the Z ROS 32 are structurally identical to the X ROS illustrated in FIG. 3E. X ROS 30 contains an X ROS array, which may be a conventional ROS with an address input provided by the line labeled X next address bits 0-11. This 12 bit address is supplied at the end of an X cycle. During the next two cycles of the clock (Y cycle and Z cycle), the X ROS select line is active so that the array selects (i.e. accesses) the ROS microword located at the last received X next address currently found in register 24 (FIG. 3B). The selected microword is than provided on the output lines 0-15 of the X ROS array to correspondingly set X ROS output latches 60 through 75 shown in FIG. 3E; and early during this microword access, the X latch reset line is pulsed to reset the latches. During the following X cycle, latches 60-75 output the current X ROS microword, during which it is executed. Simultaneous with the execution of the microword during this X cycle, the next address is generated for the X ROS by the generator in FIG. 3A. Thus, the buffering by output latches 60-75 is maintained through the current X cycle to permit the generation of the next address. This overlapped timing is illustrated in FIG. 1 in relation to the timings in the Y ROS and Z ROS, which are identical to the timing in the X ROS, except that the Y ROS operations are one cycle behind the X ROS and the Z ROS operations are two cycles behind the X ROS, as illustrated in FIG. 1.

Control Store Controls—General (FIG. 3)

FIG. 3 shows the general layout of the embodiment. The clock drives the embodiment with a sequence of three cycles, X cycle, Y cycle and Z cycle, which continuously repeat, as shown in FIG. 1. The embodiment comprises a ROS next address generator (shown in detail in FIG. 3A) which generates a ROS next address during every ROS cycle, as is seen in FIG. 1. It provides each ROS next address as its output, which is the input of a ROS current word selector (shown in detail in FIG. 3B), which uses each received next address to select (i.e. access) a microword from each of the three ROS modules, X, Y, and Z. The microword selections overlap during the two cycles which follow the address generation cycle. The selector outputs each selected microword to microword decoder circuits (shown in detail in FIG. 3C). Many of the decoder outputs are feedback inputs to the ROS next address generator. Also in FIG. 3, "use" source select circuits (shown in detail in FIG. 3D) support the execution of the "use" microwords in the interleaved ROS module environment. The "use" source select circuits receive special outputs from the microword decoder circuits and feedback special inputs to the ROS next address generator.

ROS Next Address Generator (FIG. 3A)

FIG. 3A illustrates circuits used for generating the 12 bit ROS addresses. It supports different addressing modes: (1) normal, (2) branch unconditional, and (3) conditional branch.

The normal addressing mode uses the compact next address modifier field in "normal" microwords. The normal-mode support circuits in FIG. 3A use circuit 22 to exclusive-OR the output of one of AND gates 11, 12 or 13 with the output of one of AND gates 14, 15 or 16. That is, the AND gates in each of these two groups activated by the same clock cycle (X, Y or Z) are inputted respectively to inputs 22a and 22b of exclusive-OR circuit 22 to generate the ROS next address, which is outputted from OR circuit 23.

The branch unconditional addressing mode is supported by AND gate 21 in FIG. 3A to output a ROS next address from OR circuit 23.

The conditional branch addressing mode is performed by a "use" microword (shown in FIG. 7), which actuates the output of AND gate 10 or one of AND gates 11, 12 or 13 to input 22b of exclusive-OR circuit 22 and the output of AND gates 17 and 90 to the other input 22a.

ROS Current Word Selector (FIG. 3B)

FIG. 3B shows the circuits which access each microword, using the output of the ROS next address generator in FIG. 3A, which is loaded into a corresponding one of next address registers 24, 25 or 26, as determined by which of the three clock cycles is active at the particular time. Once loaded, these registers continue to output their next address bits during the two following clock cycles to the respective ROS 30, 31 or 32, which then performs the microword selection in the conventional manner. On the third cycle after being loaded (i.e. next active cycle for the same ROS), the selected ROS microword is outputted to a respective AND gate 36, 37 or 38 which have their outputs combined in an OR circuit 39 that provides the selected microword on the 16-line of bus 41. Also, some of the lines in bus 41 are provided as outputs 42 and 43 which provide selected fields in the selected microword.

ROS Microword Decoder Circuits (FIG. 3C)

Decoder 400 in FIG. 3C receives and decodes each microword outputted from FIG. 3B. The decoder output lines 401 a through n provide signals to the data in FIG. 2 to execute normal microwords read from the content of the X ROS, Y ROS and Z ROS. The circuitry in FIG. 3C external to decoder 400 provides additional decoding and control needed to support the execution of unconditional and conditional branch addressing modes.

OPERATION OF THE NEXT ADDRESSING MODES

Normal Next Addressing Mode

Figure 4A:
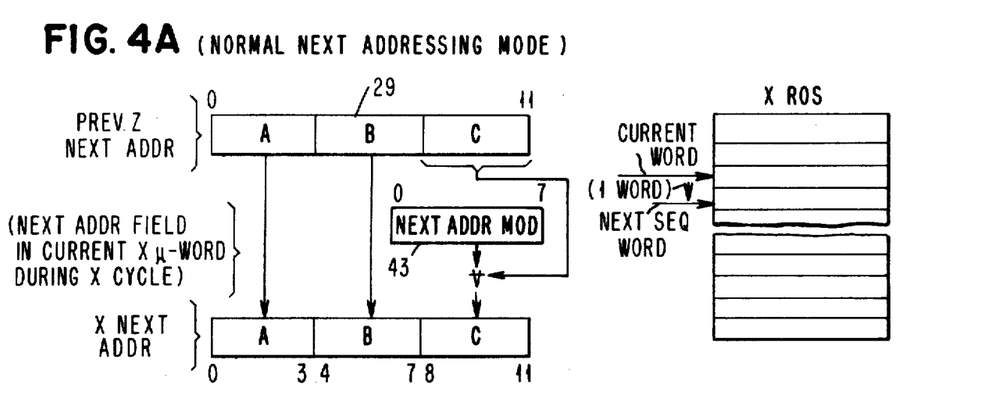
FIGS. 4A, 4B and 4C provide logical representations of the "normal" next addressing mode used in the preferred embodiment.
Figure 4B:
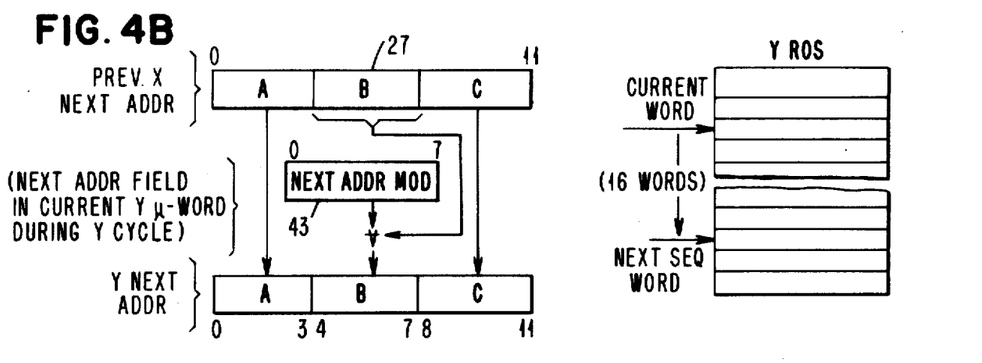
Figure 4C:
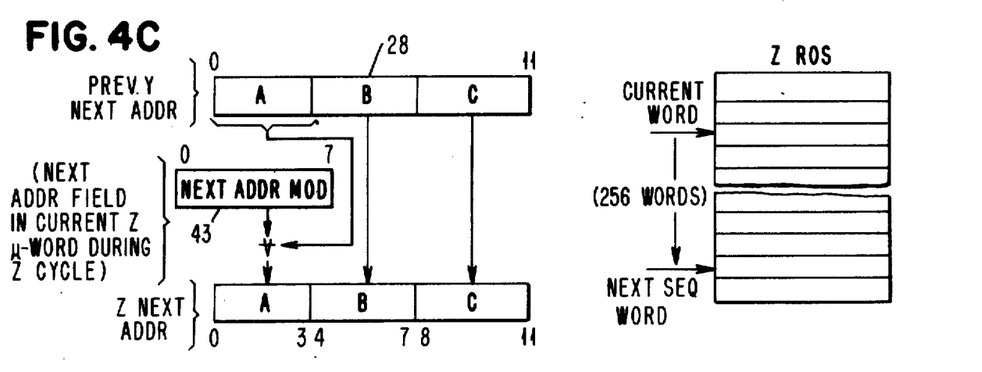
Figure 7:
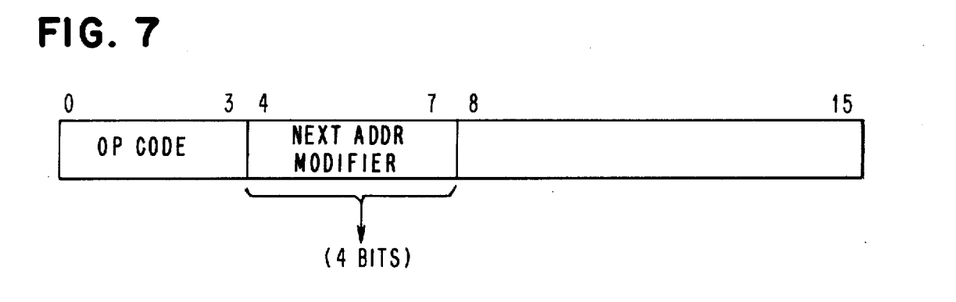

FIG. 7 illustrates a format for a 16 bit microword containing a 4 bit next address modifier field which can be used in all normal mode microwords stored in any of the X, Y or Z ROS stores 30, 31 or 32 in FIG. 3B. In the format, bits 4–7 contain the 4 bit next address modifier field. Bits 0–3 contain an operation code for the microword, and bits 8–15 can contain any type of fields required for normal control store operation. The operations performed on the next address modifier field 4–7 are controlled by the hardware illustrated in FIG. 3A, which generates the 12 bit address required for accessing the next microword in the control store in FIG. 3B. As previously mentioned, the normal mode next address is generated by combining the output from one of AND gates 11, 12 or 13 with an output from one of AND gates 14, 15 or 16 in exclusive-OR circuit 22 in FIG. 3A during a related clock cycle. This combining operation is now explained in relation to FIGS. 4A, 4B and 4C for the three different ROS's. The combining operation can be understood in terms of justifying (i.e. aligning) the 4 bit address modifier field in relation to one of three different positions A, B and C in the complete 12 bit micro-instruction address previously outputted during the last clock cycle by OR circuit 23 in FIG. 3A and currently stored in one of registers 24, 25 or 26 in FIG. 3B. The previous next address is available on bus 27, 28 or 29 in FIG. 3B, which are respectively provided as inputs to gates 12, 13 and 11 in FIG. 3A. Thus, the previous Z next address in FIG. 4A is derived from bus 29 in FIG. 3B, and similarly the previous X and Y next addresses in FIGS. 4B and 4C are respectively derived from buses 27 and 28 in FIG. 3B. The next address modifier field shown in each of FIGS. 4A, B and C is derived from lines 43 in FIG. 3B which are supplied as an input to each of gates 14, 15 and 16 in FIG. 3A. It is noted that the justification of the next address modifier field differs in each of FIGS. 4A, B and C, wherein it is justified at position C in FIG. 4A (i.e. bits 8–11 from gate 16), at position B in FIG. 4B (i.e. bits 4–7 from gate 15), and at position A in FIG. C (i.e. bits 0–3 from gate 14). Thus the justification is controlled by the different sets of four parallel lines from the respective AND gates 14, 15 and 16 which connect to corresponding bit positions in the exclusive-OR circuit 22.

The result of the exclusive-OR operation by circuit 2 is represented in FIG. 4A by the X next address, in FIG. 4B by the Y next address, and in FIG. 4C by the Z next address.

Thus it is seen in FIGS. 4A, B and C that the address modifications differ for the three ROS's, because of the different justifications required. Thus, in FIG. 4A the address modification for the X ROS only operates on the low-order end of the X next addresses, and thereby permits the X ROS accesses to be spaced at minimum intervals of one microword. However, it is seen in FIG.

4B that the Y next addresses are modified only in their middle field B, which permits Y ROS accesses to have a minimum spacing increment of a 16 word interval. In a similar sense, the Z next address is modified only in its high-order field A, so that the Z ROS accesses have a minimum spacing increment of 256 word intervals.

The three different justifications A, B and C cover the complete 12 bit address range for ROS addressing. It is apparent that during any three sequential cycles of the ROS clock, the entire 12 bit addressing expanse is covered, so that the total ROS next address can be modified to access any microword in any of the three ROS modules. The address sequencing is made by a microprogrammer when writing microcode, and the absolute microword addresses in the ROS modules can be done either by a human or with the assistance of an assembler program.

The relationship between the clock cycles, the previously generated ROS next address combined with the current microword's address modifier field to provide the currently generated ROS next address is represented in the following Table 1:

TABLE 1

| | NEXT ADDRESS (N.A.) GENERATION (GEN.) | | |
|---|---|---|---|
| CYCLE TIME | PREVIOUSLY GEN. N.A. | CURRENTLY GEN. N.A. | ADDR OF EXEC. M-WORD |
| 1 | Z | X(1) | |
| 2 | X(1) | Y(1) | |
| 3 | Y(1) | Z(1) | |
| 4 | Z(1) | X(2) | X(1) |
| 5 | X(2) | Y(2) | Y(1) |
| 6 | Y(2) | Z(2) | Z(1) |
| . | . | . | . |
| . | . | . | . |
| . | . | . | . |

Branch Unconditional Next Addressing Mode

Figure 6:
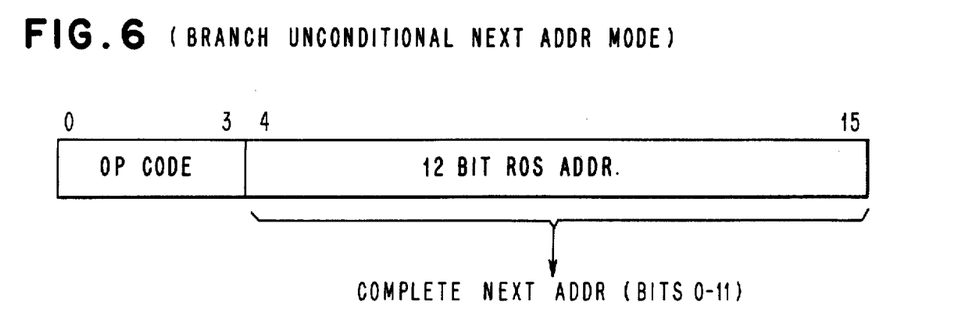
FIGS. 6 through 9 illustrate formats for several different types of microwords used in the preferred embodiment.

Whenever the ROS system is initially started, a 12 bit address is required to specify the starting microword in the control store. This is determined by a branch unconditional microword of the type illustrated in FIG. 6, which contains a complete 12 bit ROS address. In FIG. 3A, AND gate 21 provides the 12 bit ROS address to OR circuit 23 whenever a branch unconditional microword is signalled on line 45 from FIG. 3C to the input of AND gate 21. The other input to gate 21 is provided on bus 42 from the selected microword in FIG. 3B, to provide the 12 bit ROS address field contained in the branch unconditional microword.

Conditional Branch Next Addressing Mode

Figure 5:
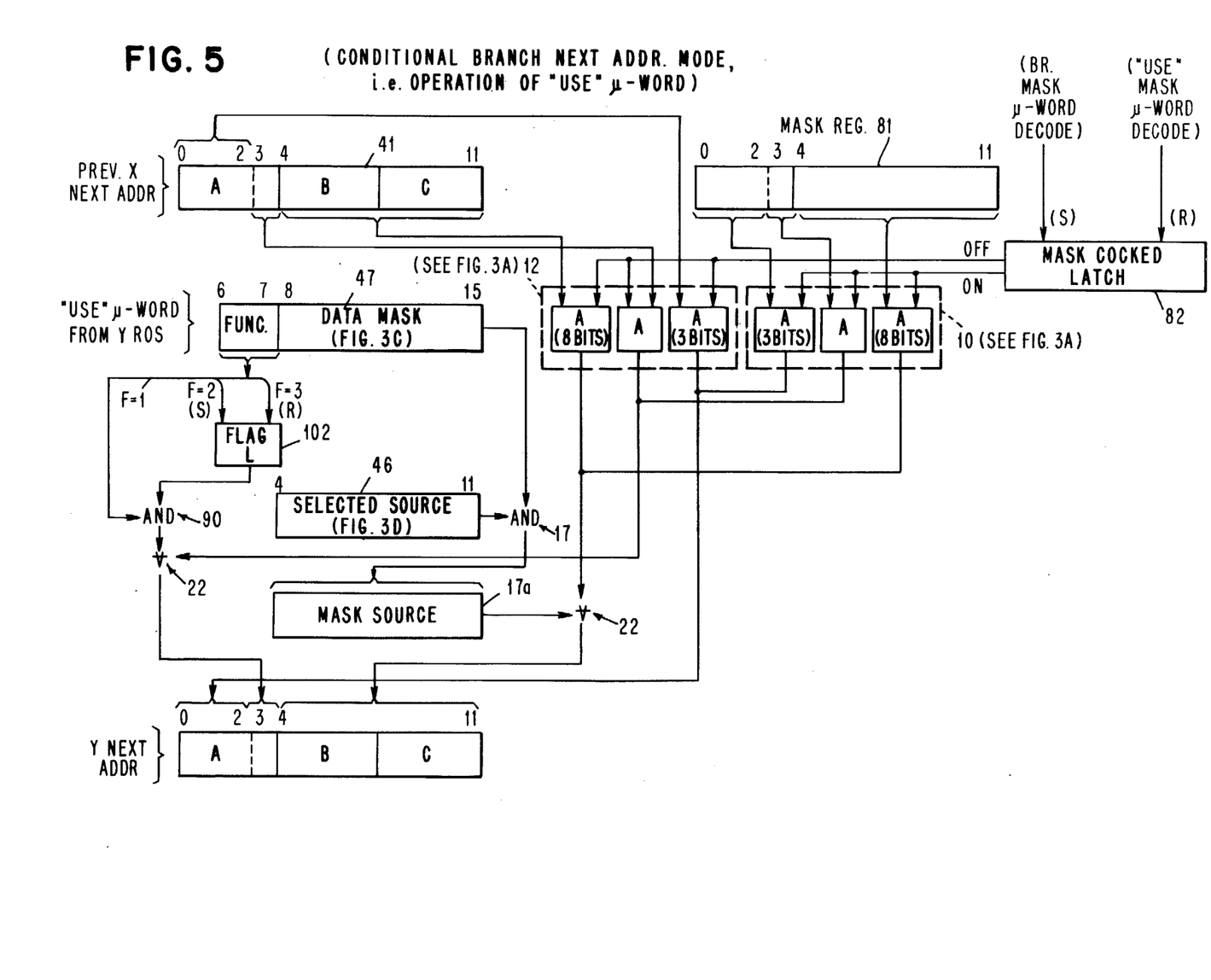
FIG. 5 provides a logical representation of the conditional branch next addressing mode implemented by "use" microwords in the preferred embodiment.

FIG. 5 illustrates the conditional branch mode of operation. It generates a ROS next address, in which the low-order part of the generated next address is controlled by maskable data from any of four selectable registers in the data path exclusive-OR'd with corresponding bits from either: (a) the previous ROS next address, or (b) microprogram data in a mask register. A high-order part of the generated ROS next address is taken directly from the corresponding bits in either: (c) the previous ROS next address, or (d) the mask register. The choice between (a) and (c) or (b) and (d) is determined by the setting of a mask cocked latch. An intermediate field in the generated ROS next address is controlled by the setting of a flag latch and the masked cocked latch.

All of these operations are controlled by the "use" microword. The "use" microword format is illustrated in FIG. 8.

Figure 2:
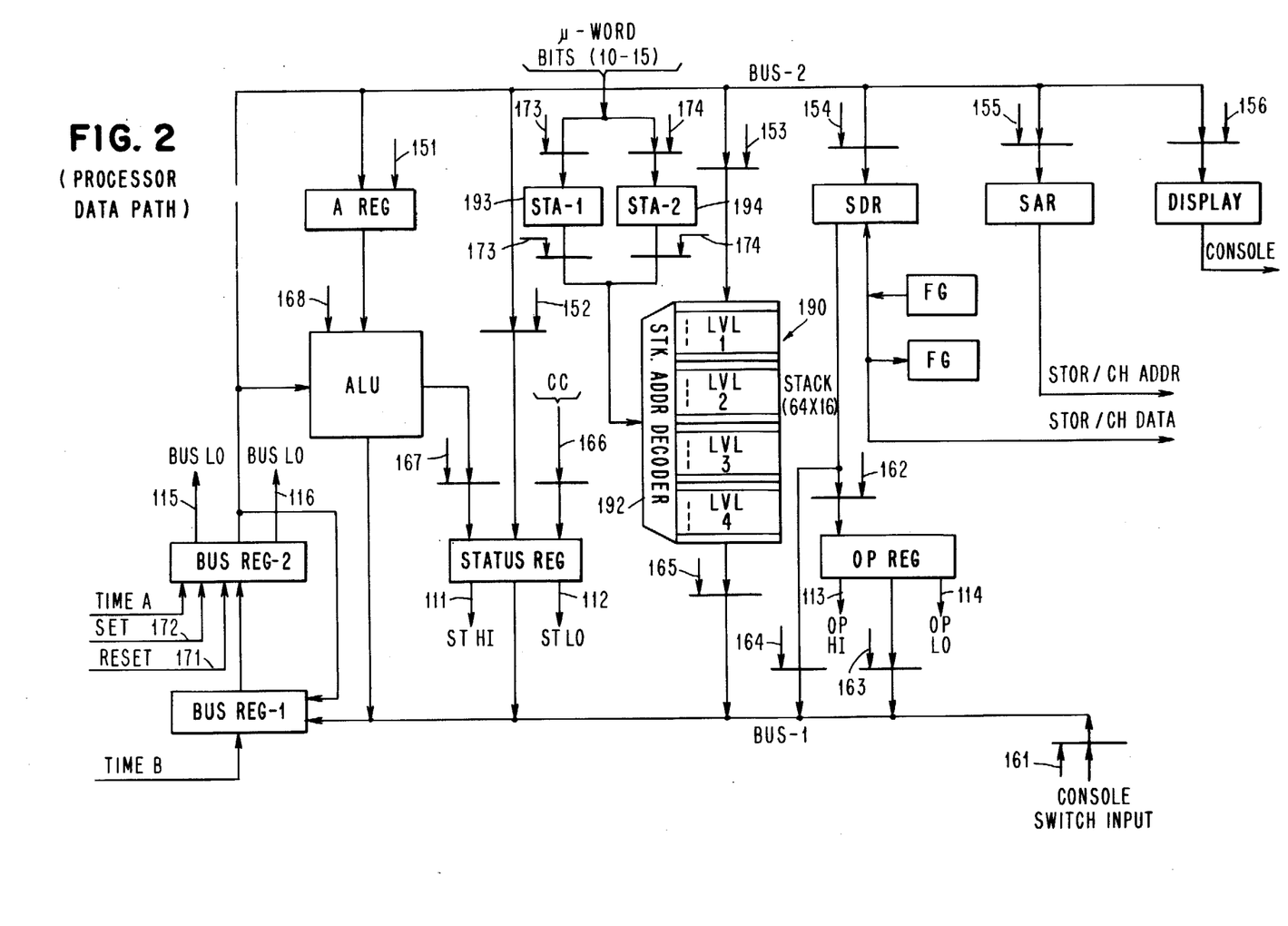
FIG. 2 illustrates a data path used in the preferred embodiment.

The execution of the "use" microword is controlled by the hardware in FIG. 3D; by gates 10, 17 and 90 in FIG. 3A; and by most of the hardware external to the microword decoder in FIG. 3C. The data path bits used by a "use" instruction are selected by the circuits in FIG. 3D, which receive control inputs from FIG. 3C and data inputs from FIG. 2. The selected data path bits are outputted from FIG. 3D to gate 17 in FIG. 3A.

The rather complex sequence of operations executable by a "use" microword for generating the ROS next address is illustrated in the example shown in FIG. 5. It starts with the previous X next address generated during the last clock cycle and ends with the generation of the Y next address during the current clock cycle.

Figure 8:
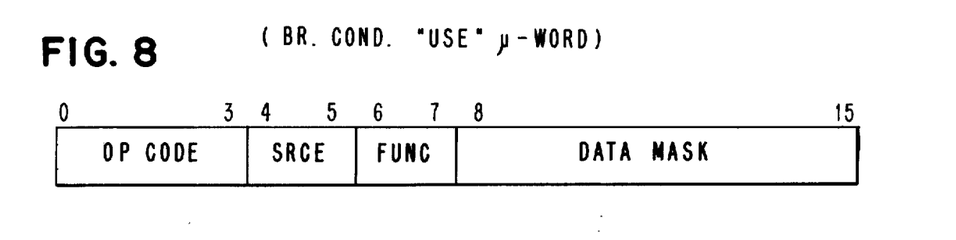

The particular bits in the data path are selected by the source (SRCE) field and the OP code shown in FIG. 8. The source field specifies one of four places in the data path from which bits can be selected by a "use" microword. These four places are shown in FIG. 2 and are from one of: the status register, the OP register, the bus register, or the external bits. The source field is a 2 bit address which is decoded by a decoder 100 in FIG. 3C.

However, only one-half of the 16 data path bits in the selected source are used by a "use" microword. The OP code of the "use" microword designates which half is selected by indicating if it is the high-order 8 bits (HI) or the low-order 8 bits (LO). These two different "use" microwords, which are only distinguished by their OP codes, in which one selects the HI byte of the designated source and the other selects the LO byte from the designated source.

The selection of one-half of the data path source bits is because of the pragmatic situation of having a 16 bit microword, a 16 bit wide data path in FIG. 2, and the need to accommodate a data mask field in the "use" microword which has its other eight bits occupied by other fields. Hence, only an 8 bit data mask can be accommodated in the 16 bit "use" microword.

The "use" source selection circuits in FIG. 3D control the 8 bit data path selection operation. These circuits receive the decoder control lines 94, 95, 96 and 97 from the "use" source decoded 100 in FIG. 3C to select the data path source. They also receive the HI-byte line 91 and LO-byte line 92 provided from the microword decoder in FIG. 3C to signal which of the two types of "use" microwords are being executed. The data path inputs in the circuit FIG. 3D receive the correspondingly numbered output signal lines from FIG. 2.

The data mask field occupies bit positions 8 through 15 in the "use" microword (see FIG. 8), and it is used as a mask on the eight data bits selected from one of the four placed in the data path.

As shown in FIG. 5, the mask field 47 is AND'd with the selected source bits 46 outputted from FIG. 3D. AND gate 17 in FIG. 3A receives these signals on lines 46 and 47 and provides the mask source field 17 shown in FIG. 5. The mask source field 17a is then exclusive-OR'd with the low-order eight bits of the previously generated X next address during an X cycle, or alternatively with the low-order eight bits in the branch mask register, depending on the setting of a mask cocked latch 82. Thus, the Y next address which is being generated during a Y cycle can be generated from one of two 12 bit base addresses, one being the previous X next address, and the alternative being the 12 bit content of the mask register. Exclusive-OR circuit 22 in FIG. 3A generates the Y next address. Its low-order eight bits at bit positions 4–11 and its intermediate field at bit 3 are provided by AND circuits 17 and 90 to input 22a of exclusive-OR circuit 22 and its other input 22b receives a 12 bit field from either AND gate 10 or one of AND gates 11, 12 or 13. Gate 10 outputs the mask register if enabled by the mask cocked latch being on. But if the mask cocked latch is off, gate 12 is enabled during the Y cycle to select the previous X next address. The high-order bits 0–2 in the selected 12 bit field applied to input 22b are passed through circuit 22 unchanged through exclusive-OR circuit 22 because there are no corresponding high-order bits being applied to the other input 22a, and hence they become part of the outputted Y next address. The intermediate field at bit 3 is generated in circuit 22 under the control of AND gate 90 which is being controlled by the function field bits 6 and 7 in the "use" microword in FIG. 8. These function bits are inputted to a "use" flag decoder 101 in FIG. 3C, which provides outputs 1, 2 and 3, depending on the coding of bits 6 and 7. F=1 indicates a test signal which is provided as an input to gate 90 in FIG. 3A. A flag latch 102 in FIG. 3C also provides an input to gate 90 in FIG. 3A to condition the gate when the latch is on. It is set on by an F=2 signal from decoder 101, and it is set off by an F=3 signal from decoder 101. The set, reset, and test conditions of flag latch 102 are controlled by different microwords in a microprogram.

Figure 9:
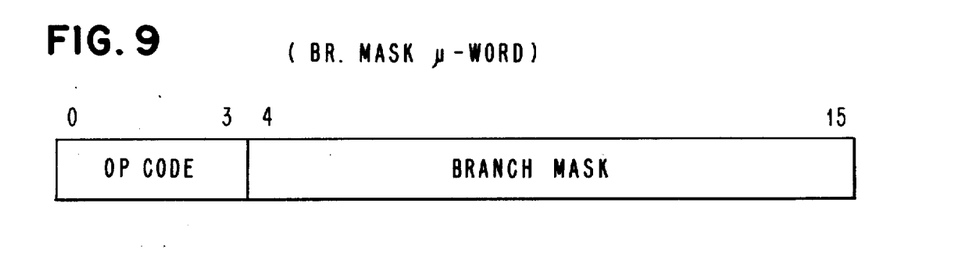
Figure 10:
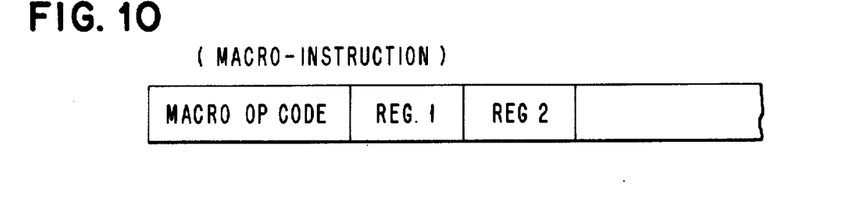
FIG. 10 illustrates part of a well known macroinstruction format designating general purpose registers.

The branch mask register 81 in FIG. 3C is loaded by a branch mask microword shown in FIG. 9. Execution of the branch mask instruction not only loads branch mask register 81 but also sets the mask cocked latch 82, which is reset by the execution of a next "use" microword. Accordingly, the loading of the branch mask register 81 can only be used once by a "use" microword. It must therefore be explicitly loaded for each "use" microword which intends to use the branch mask register.

REGISTER SELECT CONTROL

Many macro-instructions commonly used by computer programmers designate one or more general purpose registers (GPR's). FIG. 9 is an example of a macro-instruction designating two GPR's, R1 and R2. Whenever such macro-instruction is executed, the machine must identify and use each designated GPR in the manner required by the macro-instruction.

The interleaved module control store described in this specification provides unique support for GPR designation by macro-instructions. The data path shown in FIG. 2 has a stack 190 which contains four levels, each having eight GPR's which may be designated in macro-instructions by a three bit field. The interpretation of the operation code of the macro-instruction by a microprogram will determine which three bit field (if any) is used for R1 and which other three bit field (if any) is used for R2. Such microprogram will call the micro-routine exemplified in the following Table II.

TABLE II

| TIME CYCLE | MICRO-WORD |
|---|---|
| X(1) | Branch Mask 010 |
| Y(1) | USE R1 |

TABLE II-continued

| TIME CYCLE | MICRO-WORD |
|---|---|
| Z(1) | Branch UNC |
| X(2) | Branch Mask 010 (for next micro-routine) |
| Y(2) | Read GPR R1 |
| Z(2) | (Branch target microword in next micro-routine) |
| | or (or if R2 is designated) |
| Z(2) | Use R2 |
| X(3) | Branch UNC |
| Y(3) | (any microword for next micro-routine) |
| Z(3) | (Branch target microword in next micro-routine) |

Figure 11:
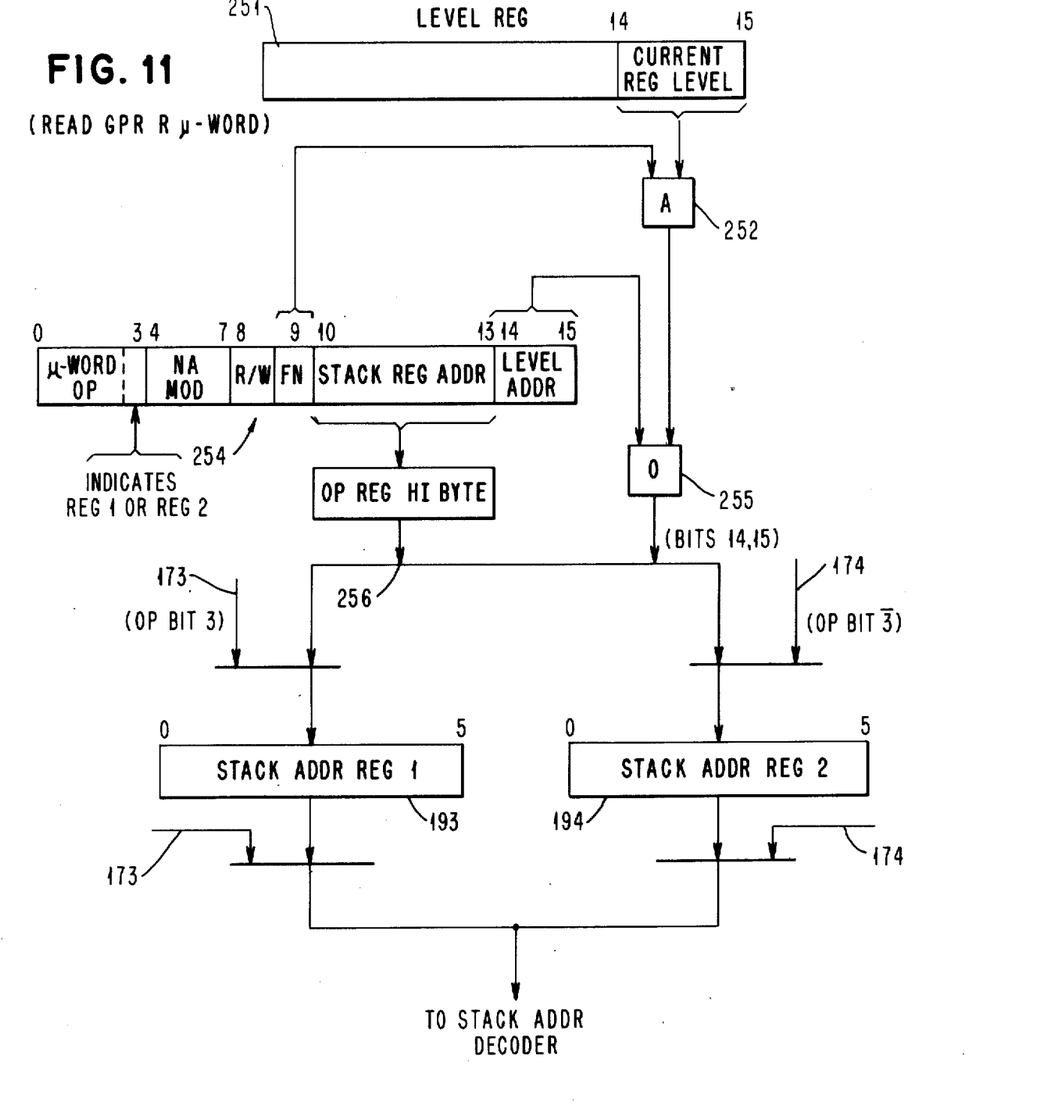
FIG. 11 shows hardware support in the invention for selecting general purpose registers under micro-routine control.

This micro-routine is supported by hardware represented in FIGS. 2 and 11. In FIG. 2, the GPR's are contained in stack 190, which is divided into four levels, LVL 1 through LVL 4, each containing eight GPR's, designated as 0 through 7. A five bit address designates any of the 32 GPR's in stack 190, in which two bits designate one of the four levels and three bits designate one of the eight GPR's in the designated level. The five bit GPR stack address in put into either a stack address register 193 (i.e. STA-1) for an R1 designation, or a stack address register 194 (i.e. STA-2) for an R2 designation in a macro-instruction.

The GPR select micro-routine in TABLE II operates as follows in the time interleaved module environment of this invention, in which the first cycle is assumed to be an X(1) cycle. The X(1) cycle executes a branch mask microword and sets the branch mask register to address 010, the address of the read microword for the first GPR in Level 0, which is used as a base address for all GPR's at any level. The Y(1) cycle executes a USE instruction, as previously described herein, in which the HI byte in the OP register in FIG. 2 is designated as the source which contains the R1 designation in its bit positions 5, 6, 7, and the data mask only selects these bit positions.

The level address output of OR circuit 55 and the GPR address output are concatenated on bus 256 and gated into the register 193 or 194 selected by bit 3 of the read GPR microword. The stack address decoder 192 in FIG. 2 then decodes this address and selects the required GPR.

During the Z(1) cycle a branch unconditional microword is executed, so that during the Z(2) cycle the branch target microword can be executed. If the current macro-instruction designates an R2, its target routine will be similar to the routine for selecting the GPR designated by R1.

During the X(2) cycle, the first microword for the next micro-routine can be executed. If the next routine selects R2, the X(2) cycle can again execute the branch mask microword.

During the Y(2) cycle, the read GPR microword is executed. This uses the circuits shown in FIGS. 11 and 2.

FIG. 11 illustrates the operation of the Read GPR microword in a register 254. Its bits 0–7 are as previously described for a normal addressing mode microword. Bit 8 is set to 0 to indicate that the microword is to read a GPR. Bit 9 is a function (FN) field which controls where the level address is derived. If bit 9 is set to 1, the level address is derived from the current level field 14, 15 in a level register 251 via enabled AND gate 252. But if bit 9 is set to 0, the level address is instead derived from bits 14, 15 of the Read GPR microword. The two bit selected level address is concatenated with the three bit GPR address obtained from the microword output of FIG. 3C in bus 256 and gated into stack address register 193 or 194 as determined by the setting of OP code bit 3 in the Read GPR microword, and gated out of the same register to access the GPR in the stack.

Although the invention has been shown and described with respect to a preferred embodiment thereof, it should be understood by those skilled in the art that various changes and omissions in the form and details of the invention may be made therein without departing from the spirit and the scope of the invention, which is to be limited only as set forth in the following claims.

What is claimed is:

1. A control store system, comprising
a plurality of modules for storing control words,
clock synchronization means providing clock cycles, a plurality of sequential clock cycles representing a cycle group, each module being uniquely associated with a respective clock cycle within each cycle group,
a plurality of address registering means, each address registering means uniquely associated with a respective module for storing a control word address and for selecting from its corresponding module a control word having a next address modifier field from among plural types of control words, the modifier field being shorter than the control word address,
a plurality of next address gating means, each next address gating means uniquely associated with a respective module for receiving a module select address from the corresponding address registering means,
a plurality of alignment gating means, each alignment gating means uniquely associated with a respective module for receiving the modifier field in the control word outputted by one of the different modules, each alignment gating means providing a different alignment for a received modifier field in relation to the address for its module,
a plurality of next address controls, each next address control being comprised of the next address gating means and the alignment gating means associated with each respective module, each next address control being actuated by the clock synchronization means during the clock cycle in each cycle group associated with the respective module, and the different cycles in each cycle group actuating the corresponding next address controls such that the outputs of the next address controls are staggered in time,
combining means for receiving the staggered outputs from the next address controls and sequentially providing the next control word addresses for the modules, register gating means for connecting the sequential output of the combining means selectively to the respective address registering means under gating control of the respective clock cycles for the respective modules,
a plurality of output gating means, each output gating means uniquely associated with a respective module for gating the output of a respective address registering means to its module during at least one clock cycle different from the clock cycle associated with the respective module in each cycle group to overlap the control word selection operation in the respective module concurrently with the next address generation using a modifier field with respect to at least one other of the plurality of modules,
whereby the modules are operated in an overlapped and interleaved manner.

2. A control store system, as defined in claim 1, further comprising
a plurality of control word registers respectively connected to outputs of the respective modules,
a plurality of output control gating means respectively connected to outputs of the control word registers and being respectively actuated by the respective clock cycles for the associated modules during each cycle group, and
control word output means connected in common to outputs of the control gating means to output any modifier field in each control word gated from the control word registers,
whereby the control word output means provides a sequence of control words.

3. A control store system, as defined in claim 1, in which
each address registering means accommodates a control store address having a minimum number of bits required to address only one of the control store modules.

4. A control store system, as defined in claim 1, in which
the combining means comprises an Exclusive-OR circuit.

5. A control store system as defined in claim 2, further comprising
control word decoder circuits,
means for transferring selected bit positions from the control word output means to the control word decoder circuits, and
means for detecting bits and bit combinations in the decoder circuits to control a data path of a processor.

6. A control store system, as defined in claim 2, in which
the plurality of control store modules comprises three modules.

7. A control store system, as defined in claim 3, in which
each control store address comprises twelve bits and each next address modifier field comprises four bits.

8. A control store system, as defined in claim 5, further comprising
detecting means in the decoder circuits for sensing a control word type having a complete control store address which is an unconditional branch address, and
bypass means for allowing the unconditional branch address to bypass the combining means to provide the next address for one of the plurality of modules.

9. A control store system, as defined in claim 5, the decoder circuits further comprising
conditional branch detection means for sensing mask bits in a received control word detected as a conditional branch control word,
data path selection means for selecting data path signals from a data path of a processing system, masking means receiving the mask bits and the data path signals and masking the data path signals under control of the mask bits derived from the conditional branch control word, and the combining means receiving the output of the masking means and an address from one of the address registering means, whereby the combining means provides the next address for one of the plurality of modules.

10. A control store system as defined in claim 5, the control word decoder circuits further comprising a microword decoder connected to the control word output means, a use signal provided by microword decoder detection of a conditional branch control word, a flag field decoder receiving a flag field in a conditional branch control word from the control word output means and providing a test signal, flag latch means being settable by a signal from the flag field decoder to provide a flag-latch-on signal, source gating means for selecting source bit positions in a data path, first AND gate means connected to the selected source bit positions of the source gating means and the use signal from the microword decoder, second AND gate means receiving the test signal from the flag field decoder, receiving the flag latch on signal from the flag latch means, and the use signal from the microword decoder, and the combining means receiving the output of the first AND gate means, receiving the output of the second AND gate means, and receiving a current module address from one of the address gating means actuated by the clock synchronization means, whereby the combining means generates a next address for the next module to be selected.

11. A control store system as defined in claim 10, further comprising a mask register for receiving programmed data in a control word, a mask cocked latch being settable by a branch mask signal from the microword decoder, a disabling input to the plurality of address gating means actuated by the setting of the mask cocked latch upon decoding a conditional branch instruction, third AND gate means for receiving the output of the mask register and a signal from the mask cocked latch to provide a mask register signal to the combining means when the mask cocked latch is set, whereby the combining means generates a next address for one of the modules independent of the current addresses for the modules when the mask cocked latch is on, but generates a next address dependent on one of the module addresses selected by the clock synchronization means when the mask cocked latch is off.

12. A control store system as defined in claim 5, the control word decoder circuits further comprising a microword decoder for detecting a register selection control word for selecting general registers addressed by macro-instructions, a data path having a stack of general registers, a stack address register connected to the microword decoder for storing the address of an addressed general register to be selected in the stack, means for transferring the address of a general register from the decoder circuits to the stack address register in response to a signal on an output of the microword decoder, whereby the addressed general register is selected from the stack.

13. A control store system, as defined in claim 12, the control word decoder circuits further comprising a level register having a current level field for addressing one of plural groups of general registers in the stack, and means for gating the level field from the level register to high-order bit positions in the stack address register, whereby the stack address register addresses both a selected group of registers in the stack and a particular register in the selected group.

14. A control store system, as defined in claim 13, the control word circuits further comprising means for sensing a function field in a decoded control word to indicate the selection of either a level field stored in the level register or a level field of a current control word, and means for gating the level field selected by the sensing means into the stack address register.

* * * * *